[11] 3,573,449

| [72] | Inventor | William T. Maloney<br>Sudbury, Mass. |
|---|---|---|
| [21] | Appl. No. | 769,280 |
| [22] | Filed | Oct. 21, 1968 |
| [45] | Patented | Apr. 6, 1971 |
| [73] | Assignee | Sperry Rand Corporation |

[54] OPTICAL PULSE EXPANSION SYSTEM
3 Claims, 1 Drawing Fig.
[52] U.S. Cl. .............................................. 235/181,
250/219, 250/225, 350/159, 350/161
[51] Int. Cl. .............................................. G06g 7/19,
H03k 3/42
[50] Field of Search .................................. 235/181;
350/161; 356/117; 250/216—225

[56] References Cited
UNITED STATES PATENTS

| 3,069,973 | 12/1962 | Ames | 250/225X |
| 3,111,666 | 11/1963 | Wilmotte | 235/181X |
| 3,189,746 | 6/1965 | Slobodin et al. | 250/216 |
| 3,227,034 | 1/1966 | Shelton | 250/225X |
| 3,432,647 | 3/1969 | Wilmotte | 235/181 |
| 3,441,724 | 4/1969 | Taylor | 235/181 |

*Primary Examiner*—Malcolm A. Morrison
*Assistant Examiner*—Felix D. Gruber
*Attorney*—S. C. Yeaton ABSTRACT: An optical pulse expansion device includes first and second ultrasonic light modulators and a coded mask positioned so that a collimated light beam can be passed serially through these elements and focused on a photodetector. The first ultrasonic light modulator is sandwiched between crossed polarizers that block the passage of light under quiescent conditions. First acoustic pulses are propagated through the first ultrasonic light modulator in synchronism with second acoustical pulses that are propagated through the second ultrasonic light modulator. These pulses limit the light to the acoustically stressed regions of the second ultrasonic light modulator when scanning the coded mask.

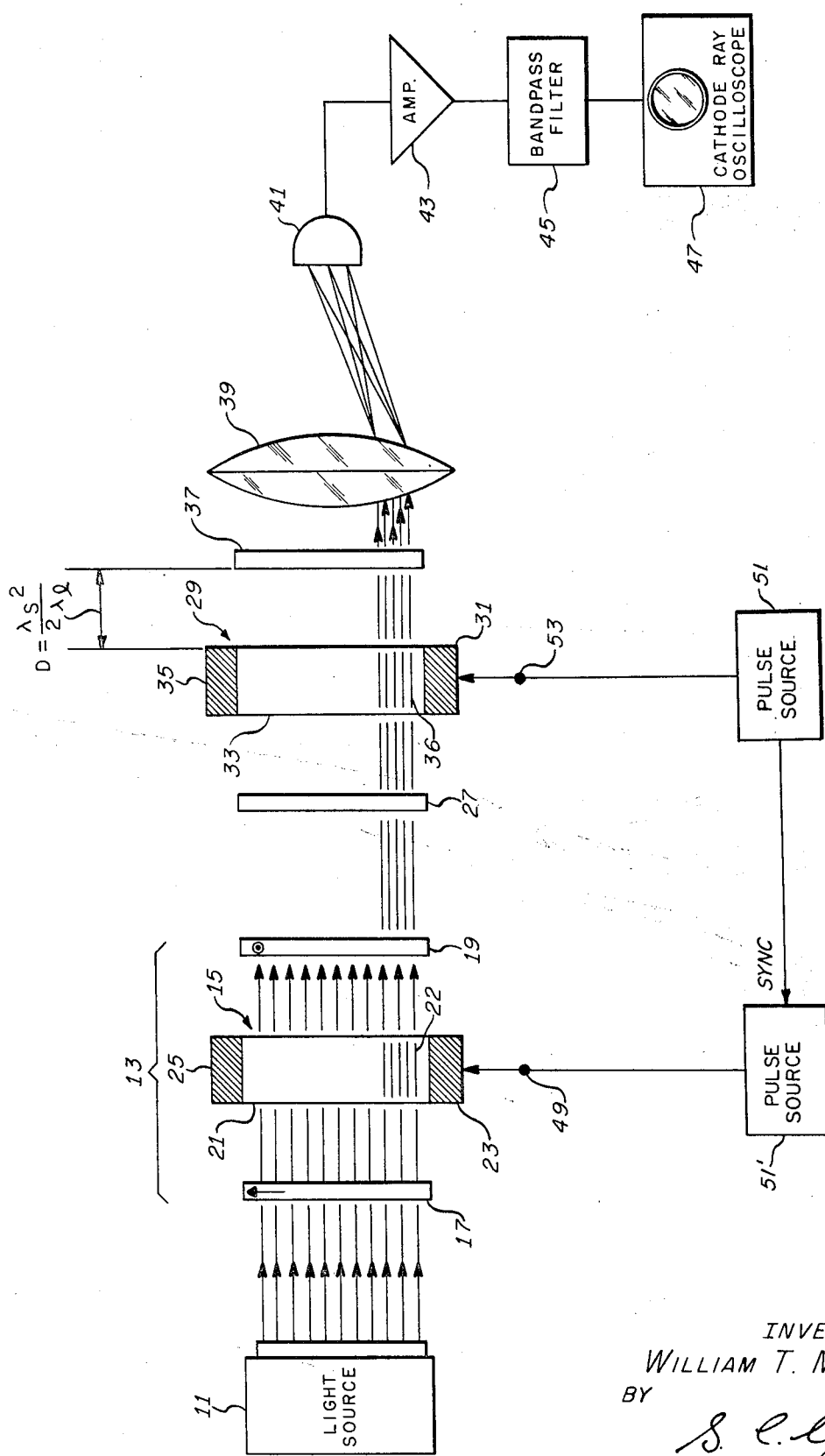

3,573,449

OPTICAL PULSE EXPANSION SYSTEM

BACKGROUND OF THE INVENTION

This invention relates to optical signal processors and more specifically to optical signal processors useful for pulse expansion. Pulse expansion is a known technique in various applications such as radar, for obtaining high resolution without loss of range capability.

Real time coherent optical correlators are known in the prior art for producing a relatively long duration electrical signal having specified characteristics in response to a short duration input signal. In general, these correlators contain a signal ultrasonic light modulator which is illuminated by a wide beam of collimated light. The light emerging from the signal ultrasonic light modulator is passed through a coded mask and used to actuate a photodetector. An acoustic wave launched in the signal ultrasonic modulator in response to an electrical signal to be processed causes an area of mechanical strain to propagate along the modulator so as to modify the index of refraction in the immediate area of the strain. If the wavelength spectrum in the energy in the acoustic pulse matches the spatial densities of the coded mask, the output of the photodetector contains information all during the scanning period. Thus, a short duration input signal will be expanded.

Light passing through the entire light modulator illuminates the coded mask. However, only the light that passes through the strained area represents a signal that is useful for scanning the coded mask. For this reason, the signal-to-noise ratio of such devices is poor.

It is an object of the present invention to provide a real time coherent optical processor that operates with a high signal-to-noise ratio.

It is another object of the present invention to provide a coherent optical processor capable of operation at a high signal-to-noise ratio without the necessity for mechanical moving parts.

SUMMARY OF THE INVENTION

The objects of the present invention are achieved by providing a real time coherent optical processor in which means are included for illuminating a signal ultrasonic light modulator with a narrow, moving beam of light that is synchronized with the sound waves launched in the signal ultrasonic light modulator so that at any time during the operation this ultrasonic light modulator is illuminated only in the area being stressed by the propagating sound waves.

BRIEF DESCRIPTION OF THE DRAWING

The sole FIGURE is a schematic diagram of an optical processor useful for pulse expansion and constructed according to the principles of the invention.

DESCRIPTION OF THE PREFERRED EMBODIMENT

The presently preferred embodiment of the invention, specifically arranged to provide pulse expansion, is illustrated in the FIGURE.

In this mode of operation the optical processor responds to a relatively short duration, electrical output signal having time and frequency characteristics specified by the mask.

A light source 11 produces a collimated, and preferably monochromatic, beam of light. This light beam is directed onto an ultrasonic scanner 13. The ultrasonic scanner includes an ultrasonic light modulator 15 sandwiched between a first light polarizing element 17 and a second light polarizing element 19.

The ultrasonic light modulator 15 is of a type generally known in the prior art. It may, for instance, be of the type described in U.S. Pat. 3,111,666, issued to R. M. Wilmotte on Nov. 19, 1963. Briefly, these ultrasonic light modulators include a transparent delay line 21. Such delay lines are conventional and may, for example, utilize a medium such as fused silica.

Acoustic waves 22 are launched in the delay line by a suitable electromechanical transducer 23 and propagate upward along the axis of the delay line. The transducer may be a conventional piezoelectric element such as a quartz plate.

An acoustical absorber 25 is placed at the opposite end of the delay line so as to reduce the amplitude of the reflected acoustic waves in the line.

The transducer is preferably arranged to provide shear waves in which material motion is perpendicular to both the longitudinal axis of the delay line and the light beam. In this situation, the first polarizing element 17 is oriented with its axis of polarization either parallel to or perpendicular to the longitudinal axis of the delay line. As illustrated in the FIGURE, the polarizing element 17 is oriented so that its axis of polarization is parallel to the axis of the delay line. The second polarizing element 19 is then arranged with its polarization axis perpendicular to that of the first polarizing element. As indicated in the FIGURE, the polarizing element 19 is arranged so that its axis of polarization is perpendicular to the axis of the delay line 15.

If the transducer were selected to produce longitudinal sound waves in which particle motion is parallel to the axis of the delay line, the polarizing elements would be oriented so that their axes of polarization are perpendicular to each other, but at 45° with respect to the axis of the delay line.

In the illustrated embodiment, ultrasonic waves propagating in the shear mode are preferred. Various elements in the FIGURE are arranged as indicated to accommodate this mode of operation.

When acoustic waves are launched in the delay line by the transducer, a strain field propagates up the line at a known velocity determined by the mode of vibration and the material from which the line is made. The strain field diffracts the incident light. Odd diffraction orders are polarized at right angles to the plane of polarization of the incident light and are thus able to pass through the polarizing element 19. Thus, as the acoustic wave moves up the delay line, a moving beam of light emerges from the shutter in the "shadow" of the strained region.

In the apparatus shown in the FIGURE, this beam of diffracted light is essentially vertically polarized although some horizontally polarized light is able to pass through the scanner. The beam is then passed through a half-wave plate 27. This half-wave plate rotates the plane of polarization by 45° and is constructed in accordance with well-known principles. The plate is oriented to produce a plane of polarization such that the light impinging on a second or signal ultrasonic light modulator 29 is oriented at an angle of 45° with respect to the longitudinal axis of this signal modulator.

If the longitudinal, rather than the shear mode of acoustic wave propagation were to be used in the apparatus, the plate 27 would preferably be arranged to provide a 0° or 90° polarization at the input face of the signal modulator 29.

Rotation of the plane of polarization by the half-wave plate is desirable since passage of the light so polarized through the signal modulator 29 does not result in further rotation of the plane of polarization.

The signal modulator 29 includes a transducer 31, a delay line 33, and an acoustic absorber 35. These elements are identical to those in the modulator 15.

When an acoustic wave 36 is launched in the delay line 33 by the transducer 31, a strain field propagates up this line in the same manner as the strain field introduced into the modulator 15.

The same vibrational mode is used in both ultrasonic light modulators. The two modulators are further constructed so as to have the same physical dimensions and from the same material so that the velocity of propagation of the acoustic wave in each line is the same.

Since the polarization of the light effected by the half-wave plate reaches the signal modulator 29 at the angles described previously, this modulator does not further influence the polarization of the light. However, the light emerging from the modulator 29 is phase modulated in accordance with the acoustic signal appearing in the delay line 33.

Light from the signal modulator 29 impinges on a conventional coded mask 37. A coded mask contains an opacity pattern determined by the characteristic of the electrical output signal to be produced. Such coded masks are well known in the art. They may, for instance, consist of ladderlike structures having series of horizontal opaque strips separated by transparent spaces. A light beam sweeping across a mask is modulated by the opaque strips and passed onto the following optical elements. The timing and duration of these modulations are determined by the mask pattern. Such masks ordinarily have a specified nonuniform spacing so that a frequency modulated wave is produced.

Light from the signal modulator 29 impinges on a collecting lens 39 and is focused on a photodetector 41. The electrical signal from the photodetector 41 is amplified in amplifier 43 and passed through a band-pass filter 45 so as to remove extraneous signal components. The signal from the filter 45 is then applied to a suitable utilization device. Expanded pulses of the type produced by the present invention are frequently used in high resolution radars. However a cathode ray oscilloscope 47 has been shown in the FIGURE for purposes of explanation. The signals to be processed originate at a source indicated generically as a pulse source 51; the signals for actuating the scanner originate in a pulse source 51'. A portion of the signal from the source 51 may be used to synchronize the source 51' so as to assure that the acoustic waves in the two ultrasonic light modulators are launched simultaneously. In this instance, the source 51' may be a conventional triggered source such as a blocking oscillator. The electrical signal from the source 51' is applied to the scanner through a terminal 49; the signal from the source 51 is applied to the signal ultrasonic light modulator through a terminal 53.

The signal modulator 29, is operated with a relatively low level signal so as to provide a linear output. In the typical case previously mentioned with respect to the scanner modulator, 1 microsecond bursts of energy at a frequency of 30 MHz supplied from the pulse source 51.

The light output at the exit face of the signal modulator 29 is a phase modulated wave. As pointed out in an article entitled: "Secondary Interference in the Fresnel Zone of Gratings" appearing on page 372 of the Journal of the Optical Society of America for 1959, such a phase-modulated wave will produce Fresnel amplitude images of the modulator pattern in planes located at specified periodic distances from the exit face of the signal modulator 29.

Briefly, the Fresnel zone concept relates to a region behind a grating where secondary interferences between the light coming through different openings produces real images of the grating. These occur at Fresnel amplitude planes. The amplitude planes occur at periodic intervals determined by the ratio of the square of the wavelength of the acoustic wave in the modulator to the wavelength of the light being used expressed mathematically this distance is given by:

$$D = \frac{\lambda_s^2}{2\lambda_l}$$

$D$ = distance for pattern to recur.
$\tau_s$ = wavelength of sound.
$\tau_l$ = wavelength of light.

Thus by placing the coded mask in a Fresnel amplitude plane, an image of the acoustic wave in the signal modulator will scan the coded mask.

If the spatial periodicities of the coded mask match the wavelength spectrum of the energy in the acoustic pulse propagating through the signal modulator, the output of the photodetector 41 will contain information all during the scanning period. Thus, the short duration input signal will be expanded to a long duration electrical signal having characteristics determined by the coded mask spacing.

Ordinarily, this spacing is designed to produce an FM signal, although any appropriate spacing may be used as desired.

The degree of expansion is determined by the ratio of the width of the full optical aperture to the width of the acoustic wave in the signal modulator.

Because the scanner modulator 15 produces an amplitude variation of the light beam in space and time at the scanner drive frequency, the light output amplitude from the signal modulator will be multiplied by this variation. In order to prevent spurious signals in the correlator output, the carrier frequencies in both modulators must be chosen so that no intermodulation products occur in the passband of the filter 45. Specifically, these carrier frequencies must be chosen so that the second harmonic spectrum of the scanner frequencies as well as the second harmonic spectrum of the scanner frequencies plus and minus the signal spectrum fall outside this passband.

In practice, this consideration has been satisfied by providing shutter input pulses in which the highest frequency is less than one-third the lowest signal input frequency.

The system is constructed so that the direction of propagation of the incident light is essentially parallel to the acoustic wave fronts in the modulators. This produces equal plus and minus diffraction orders. For shear mode acoustic waves polarized as indicated in the FIGURE only odd orders pass through the second polarizer 19. Since the light intensity falls off with the higher orders, only the first diffraction orders are of significance.

In operation, the electrical signal pulse applied to the input terminal 53 is synchronized with the scanner pulse applied to the terminal 49 so that acoustic waves are launched in the two modulators simultaneously. The acoustic waves propagate up the two delay lines in step with each other. Thus, the light beam emerging from the scanner always illuminates only the area being strained by the acoustic wave front in the signal modulator 29.

Early experiments with such devices included mechanical scanner means. Such devices proved to be impractical, however, since synchronization and timing were difficult to achieve. Furthermore, mechanical means proved to be too unreliable for many applications. These problems were overcome with the present all-electronic system.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A pulse expansion device comprising means to produce a collimated light beam; an ultrasonic scanner; a first ultrasonic light modulator in said scanner; a second ultrasonic light modulator; a coded mask; said scanner, said second light modulator and said coded mask being arranged serially in the path of said collimated light beam; said coded mask being placed in an amplitude plane of the Fresnel zone of the second light modulator; said scanner being arranged to pass light only in an area stressed by the acoustic wave; said first light modulator and said second light modulator being constructed to propagate acoustic waves at the same velocity and arranged to propagate acoustic waves in the same in the same direction across said light beam; means for simultaneously launching acoustic waves in both of said light modulators; and detection means to produce an electrical signal indicative of the instantaneous value of the total light passing through said coded mask.

2. The apparatus of claim 1 in which said ultrasonic scanner includes first and second light polarizing means arranged on opposite sides of the first ultrasonic light modulator; said first and second polarizing means being arranged so that their axes of polarization are parallel to and perpendicular to the acoustic propagation axis of the first ultrasonic light modulator respectively.

3. The apparatus of claim 2 in which the acoustic wave launching means provides burst of energy at a radiofrequency and in which the highest frequency of the acoustic wave launched in the first modulator is less than one-third the lowest frequency of the acoustic wave launched in the second modulator.